Dec. 24, 1968    H. C. EMERSON ET AL    3,418,549
COMBINED NUMERICAL AND TORQUE CONTROL FOR
A WORK AND FEED MACHINE TOOL
Filed March 19, 1962    4 Sheets-Sheet 1

INVENTORS.
H. C. EMERSON
R. F. RIEGER
R. W. KITCHIN
V. E. VAWTER

BY ATTORNEY

INVENTORS.
H. C. EMERSON
R. F. RIEGER
R. W. KITCHIN
V. E. VAWTER

BY *George E. Pearson*
ATTORNEY

United States Patent Office 3,418,549
Patented Dec. 24, 1968

3,418,549
COMBINED NUMERICAL AND TORQUE CONTROL FOR A WORK AND FEED MACHINE TOOL
Herff C. Emerson, Chula Vista, Richard F. Rieger, National City, Robert W. Kitchin, San Diego, and Verne E. Vawter, National City, Calif., assignors to Rohr Corporation, Chula Vista, Calif., a corporation of California
Filed Mar. 19, 1962, Ser. No. 180,762
15 Claims. (Cl. 318—39)

This invention relates generally to the art of metal removal as involved, for example, in drilling and milling machine operations and more particularly to a combined numerical and torque control of a machine tool in a three-axis system.

More specifically, the present invention is directed to a milling machine operation wherein the X–Y–Z axis movements of the table, ram, and cutter head are numerically controlled in the usual manner and wherein the cutter spindle speed as well as the rate of feed of the table, ram, and cutter head are controlled as a function of the spindle torque as the same varies in response to changes in the loading of the work on the cutter.

The many advantages which flow from the use of numerical control for machine tools are well known. Among those widely recognized are the complete elimination of operator inefficiency, set-up time, and need for inspection and part inventory as well as the substantial reductions effected in leadtime, tooling costs, and material handling. In view of these and other advantages, understandably, the philosophy of numerical control machining tends to become one which leans toward the ultimate guidance of all machine tool operations by programmed information on magnetic tape, punched tape, punched cards, or like media, capable of transmitting electrical control impulses on a number code.

This philosophy of programming of the machine operations, however, presupposes that the operating conditions will remain constant. Thus, for example, it is assumed that a given material will be uniformly hard and tough in all of the portions of the material which may be subjected to the machining operations.

It is known, however, that irregularities, inconsistencies, nonhomogeneties, and discontinuities may be present in a metal undergoing machining due to the intergranular structure of the material, for example, or as a result of hard and soft spots due to non-uniform application of or response of the material to heat treatments applied thereto. As a result of the variations in these and other factors, the torque required by the cutter will vary in an unpredictable manner and therefore obviously cannot be programmed in the usual sense and operation of a numerically controlled sytem. It is known, moreover, that all materials yield optimumly to a cutting tool at some specific speed and feed and, accordingly, it becomes necessary both before and during the machining operation to adjust the parameters of the machine to meet this condition for optimum machining of a given material. It thus becomes difficult, if not impossible, to successfully machine the so-called exotic metals by conventional numerical control. Without provision for some adjustment of the machine parameters in relation to the sensed reaction of the tool to the work, severe tool loss and/or damage to the work may be encountered, for example, as a result of work hardening of the material.

These difficulties and limitations of conventional numerical control systems are substantially obviated in accordance with the combined numerical and torque control concept of the present invention where, in a general sense, the numerical control is utilized in the usual sense to tell the tool and the work where to go while the tool itself, in its sensed reaction with the work, determines when or at what rate, it and the work shall move to the positions directed by the numerical control. The so-called second generation type of numerical controls customarily have a manual feed rate override control by which the opertaor may adjust the programmed feed rate at any time to fit the material or cutter condition; and by means of this control, the operator may adjust the feed rates above or below the programmed value. In accordance with the arrangement of the present invention, the tool or cutter control of the feed rate of the machine slides is acomplished by utilizing a voltage proportional to the spindle motor torque to adjust the manual speed rate overide in accordance with variations in the load sensed by the cutter. In addition, the speed of the spindle motor and the feed movement of the slides of the machine are both controlled as a function of the spindle torque, and this is accomplished, in accordance with the preferred embodiment of the invention, by establishing certain predetermined spindle motor speed-torque droop characteristiscs sufficient to meet the variations in torque required by the cutter for each particular material, this rate of speed drop being adjustable to allow a variable droop to the speed-torque curve.

Efficient metal removal of soft material such, for example, as aluminum requires high spindle r.p.m. and torque whereas hard, dense, and tough materials such, for example, as the exotic metals require low spindle r.p.m. and torque for efficient machining. Accordingly, a further feature of the present invention resides in the provision of a spindle motor and torque control therefor providing a family of speed torque curves in relation to which the motor may be set by the numerical control in accordance with the speed-torque requirements of a particular material for the efficient machining thereof. By reason of these arrangements, the usual gearing and driving connections between the spindle motor and machine slides may be dispensed with to thus improve the sensitivity of response of the torque controlled speed and feed, as well as to provide a new concept of low energy machining.

It is an object of the present invetnion therefore to provide a new and improved method and means for removing metal.

Another object in the machining of metal is to utilize the sensed reaction between the tool and its work to control the speed and feed of the tool and/or the work.

Another object in a machining operation is to control the speed and feed of a tool and/or its work as a function of the torque required by the cutting tool.

Still another object resides in the provision of a machining system wherein the feed and speed of the cutting tool and/or the work are directed by the combined effects of numerical control and the torque required by the cutting tool.

Still another object in a combined numerical and torque controlled machining system is to direct the movements of the machine by numerical control and to control the rate of such movements as a function of the loading on the cutting tool.

Another object is to provide a numerical and torque controlled machining system in which the speed of the cutting tool drive motor and the rate of the numerically controlled movements of the machine are continually adjusted as a function of the torque developed by the cutting tool drive motor.

Yet another object is to provide a combined numerical and torque controlled machining system in which the speed droop characteristics of a cutting tool drive motor are utilized to vary the speed of the motor and the rate of feed of the numerically controlled movements of the machine.

An additional object is to provide a cutting tool drive motor having speed droop characteristics comprising a family of speed-torque curves for handling a wide variety of load requirements ranging from high speed and high or low torque to low speed and low or high torque.

Still another object in a combined numerical and torque controlled machining system is to provide a cutting tool drive motor having a family of speed-torque droop characteristic curves and numerically controlled inputs for adjusting the parameters of the control motor in relation to various operating positions on the curves.

Still another object is to provide a concept of low energy machining wherein the parameters of a cutting tool drive motor may be adjusted in accordance with the energy required to perform a particular machining operation.

Still other objects, features, and advantages of the present invention are those inherent in or to be implied from the novel combination, construction, and arrangement of the parts comprising the best mode thus far devised for practicing the principles of the invention. In the accompanying drawings wherein this preferred embodiment is disclosed:

Figure 1:
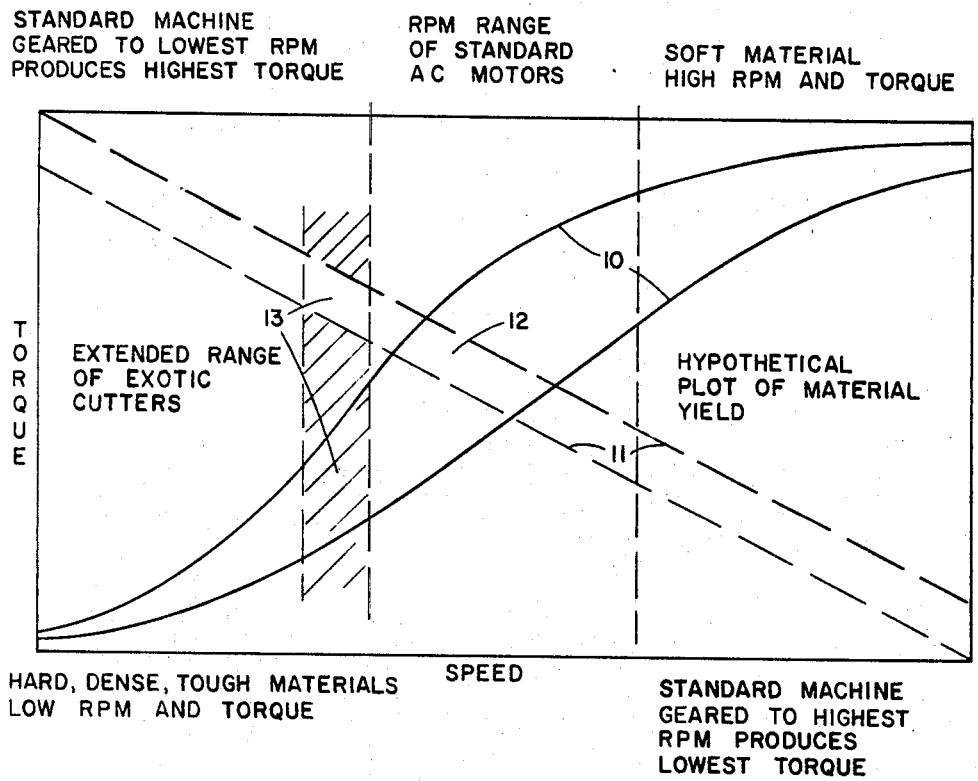
FIG. 1 is a graph illustrating the relationship between the material yield and machine capability.

The technique of controlled torque and constant cutting edge and thrust is a skill that has been practiced by old time machinists for many years. It is known, for example, that a machinist will snub the speed of his tool in order to make a cut into difficult-to-machine material. These skills, however, are individual to the operator and do not pertain generally to, nor can they be considered as a normal parameter of the man-machine combination. As a result, little thought has been given as to the need to have these skills analyzed fully to determine their effect on the man-machine combination and, to a much lesser degree, has much thought been given to the development and simulation by the machine of these skills. That this is so, is largely due to the past trend in and emphasis upon the machine design per se, apart from the contributions of the skilled machinist in producing the end results of the man-machine combination. Consequently, the analysis, experimentation, and formulation have been largely undeveloped until the advent of recent machining requirements which cannot be accomplished with conventional metal removing methods.

Torque controlled machining substantially fills this need and offers significant advantages to present machining operations such as those employing numerical control, as hereinbefore disclosed, and those involved in the machining of exotic metals. Torque control, moreover, provides the means to develop new concepts of low energy metal removal in various machining operations of both conventional and numerical control types.

As aforestated, the parameters and factors involved in the techniques of controlled torque and constant cutting edge end thrust have not been heretofore formulated, but are believed to include the following elements:

(1) The force required to cause separation, of various materials, in various fabricated and heat treat conditions can be given a value.

(2) Cutter profile can be designed to cause separation of various materials at the lowest force value.

(3) The profile force value times the area of tool exposed to the cut equals the end thrust value.

(4) The end thrust times the rate of metal removal establishes the torque.

These elements can further be expressed as a formula:

$$T = C \times R \times F \times \sin\theta \times E \times \frac{1}{V} \times M$$

where:

C=Constant
R=Rockwell hardness number
F=Material toughness factor
$\theta$=L of rake
T=Torque at the spindle
E=End thrust in p.s.i. of projected area
M=Rate of metal removal
V=Spindle r.p.m.

Factors R, F, $\theta$, and T are variables and are not necessarily linear. Factor E would be an arbitrary function of feed and speed, tool geometry, and material toughness. C is a constant of proportionality, hence:

$$1 - \frac{CRF \sin\theta EM}{TV} = 0$$

assuming torque is individually proportional to factors R, F, $\theta$, E, $1/V$, and M and further assuming that C is determined by experimental machining.

The effect of these elements, particularly speed (torque), feed (end thrust), and drill design (rake angle), on a drillnig process are considered in the following with reference to FIGS. 1 and 2. Although performance of a drill press is considered by way of example, it will be understood many of the elements of drilling can be applied to other machining operations that utilize two and three directional cutting action.

*Torque and r.p.m.*

The design of present day machine tools is a compromise for versatility. To cover the range from soft to hard materials, a mid-range of motor r.p.m. is used and speeds up or down are accomplished by gearing, as is depicted graphically in FIG. 1. This gearing produces maximum torque at lowest r.p.m. and minimum torque at highest r.p.m. From tests conducted, there is every indication that the reverse of this condition is actually required for best machine performance. For example, it has been found that to drill a ¼" hole in 01 tool steel, ($R_c57$), with a HSS drill ($R_c62.5$), 10 inch/lbs. of torque produced the best drill life. At 15 inch/lbs. the drill breaks down and the hole is lost. A mechanical feed drill unit turning at the same r.p.m. produces 1000 inch/lbs. of torque and no indentation can be made on the material. Similar tests in other material indicates that as Rockwell number decreases, torque must be increased to achieve an efficient rate of penetration. The exception is the dense, tough materials suhch as Rene' 41, A–286, etc. that have low Rockwell numbers but require low torque for best performance. From experiments conducted, it can logically be concluded that material yield and machine capability are divergent at the extremes of the scale, as may be seen in FIG. 1.

Referring now more particularly to FIG. 1, it will be seen that the chart illustrates a hypothetical plot of material yield and machine capability wherein the curves 10 represent the material yield in terms of specific cutter speeds and torque loading and the lines 11 represent the speed-torque characteristic of a standard geared AC motor. In this illustration it is evident from the chart that there is a mid-range 12 where material and machine are correctly matched. This mid-range can be slightly expanded as at 13 to newer materials by using high strength high temperature cutters. Beyond this point the disparity of material and machine become so great that present equipment cannot accomplish the task, regardless of the type of cutter used. Because the newer alloys require low torque and r.p.m., it must be assumed that holding fixtures can be of much lighter design. In many cases it may be advantageous to design the fixture to accept a template and cutter motor as an integral part of the tool. Using this approach the torque and horsepower required for a given material and depth of cut establish the energy the fixture must absorb, and from all indications these energies are low enough to allow the use of erector set type steel framing, foam and concrete, or plastics for tooling construction. The use of standard mounting pads, quick change motor mountings, and the like, enable motors to be used on a variety of tools, i.e. modular machine tooling.

*Feed and end thrust*

For hand, air, or hydraulic feed presses the end thrust is some arbitrary value, i.e., if a chip cannot be developed more pressure must be applied. On mechanical feed presses there is a fixed relationship between r.p.m. and rate of feed, each rotation of the spindle advancing the drill a set distance. Usually end thrust is established at a value determined by the limitations of the machine. For example, one type of mechanical feed unit uses a thrust release. For a ¼" drill, the release is set at 1500 lbs. to protest the unit. At this value, the force in terms of p.s.i. on the drill cutting edge amounts to approximately 80 tons. This end thrust is sufficient to literally bend the cutting edge of the drill upward, riding over the chip, and in work hardening materials, the tool or part can be destroyed.

From tests conducted there is an indication that end thrust should be established as a value in terms of p.s.i. of cutting edge area, and if this thrust is held constant hard materials can be cut quite efficiently. For example, attempts to drill 01 material ($R_c$ 60) are unsuccessful because the initial end thrust of 200 lbs. applied to the point is sufficient to bend the notched edge of a 150° split grind. By placing a piece of 302 E material on top of the 01, then drilling through the 302 E, a bearing surface for the cutting edge is provided. As the drill point breaks through the 302 E, a chip is immediately picked up in the 01 and the hole is finished in a normal manner. This experiment indicates that success is achieved as a result of constant end thrust on the cutting edge, even though the pressure applied to the drill varies, i.e. 135 lbs. unit thrust in the 302 E, 200 lbs. in the 01. Another example of controlled end thrust is a test using a bathroom scale which deflects 3/32" from 0 to 180 lbs. Because this deflection is progressive, the resistance increases as the drill point buries giving the effect of constant cutting edge thrust. Drilling 4130, 200–210,000 ½" thick with ¼" drills on a hand feed drill press produces an average of 21.5 holes with use of the bathroom scale. Without a scale, an average of 3.5 is produced. End thrust at break through is the reverse of drill entry with the added variable of heat. As the drill approaches break through, the material directly under the point does not have sufficient mass to effectively dissipate the heat generated by the cutting process. On some materials, such as René 41, the heat generated just prior to break through is sufficient to cause the material to go through a transformation resulting in extreme hardening. Once this hardening occurs the hole usually cannot be finished. Using mechanical feed and high heat resistance drills, materials such as René can be drilled by brute force. The high end thrust values produced extrude the hot burr and break through is accomplished. When holes are produced by this method, extreme periphery hardness results making enlargement by drilling, reaming, or broaching difficult. However, with a back up such as aluminum or cold roll materials to serve as a heat sink, René can be satisfactorily drilled with a hand feed drill press. For materials high in Rockwell number, drill life, hole finish and size can be greatly improved by using the sandwich technique, i.e., entering bearing plate, exit heat sink.

*Drill design—rake angle*

With conventional equipment, the high torque produced at the low speeds required for some of the new materials, dictates the use of very rigid drills. Such drills are usually of the low helix, thick web type with rake angles approaching zero. The cutting action of these drills is best described as ploughing rather than slicing. In drilling or machining there are two components to the cutting action:

(1) The separation of the material by the cutting edge.
(2) The deflection of the chip after initial separation.

If the rake angle is small, the chip must be deflected at close to 90° from the line of initial separation. This abrupt deflection creates high friction and heat. As the rake angle increases the angle of deflection decreases with corresponding decreases in friction and heat. Generally however, high rake angles provide little support for the cutting edge. Without adequate support, the cutting edge rapidly breaks down, or if high end thrust is used, the cutting edge deflects and rides over the chip. Logically, if heat is to be reduced on a drilling operation, low end thrust and high rake angles are required.

Experiments with controlled torque on a drill press have shown that low heat drilling of hard materials can be done because:

(1) The low torque possible is more nearly compatible with the yield of the material.
(2) Low torque enables the use of high rake, thin web drills.

For example, in a test conducted on René 41, a comparatively flimsy hi-spiral drill required less torque but penetrated faster than a standard style drill. Attempts to use the hi-spiral drill on two other types of presses failed when the drill broke before a chip could be satisfactorily picked up. Tests on various materials indicate that no one style of drill, point angle, web thickness, helix, etc., is best for torque controlled drilling. To develop the full potential of torque control, it is evident that tests must be conducted to find or design the most efficient drill for each material. This does not preclude the use of standard drills with the controlled torque techniques. Almost any drill with some semblance of a point will produce holes. However, for low heat and efficient rate of production, special drills are required.

*Mechanical feed and torque control compared*

Figure 2:
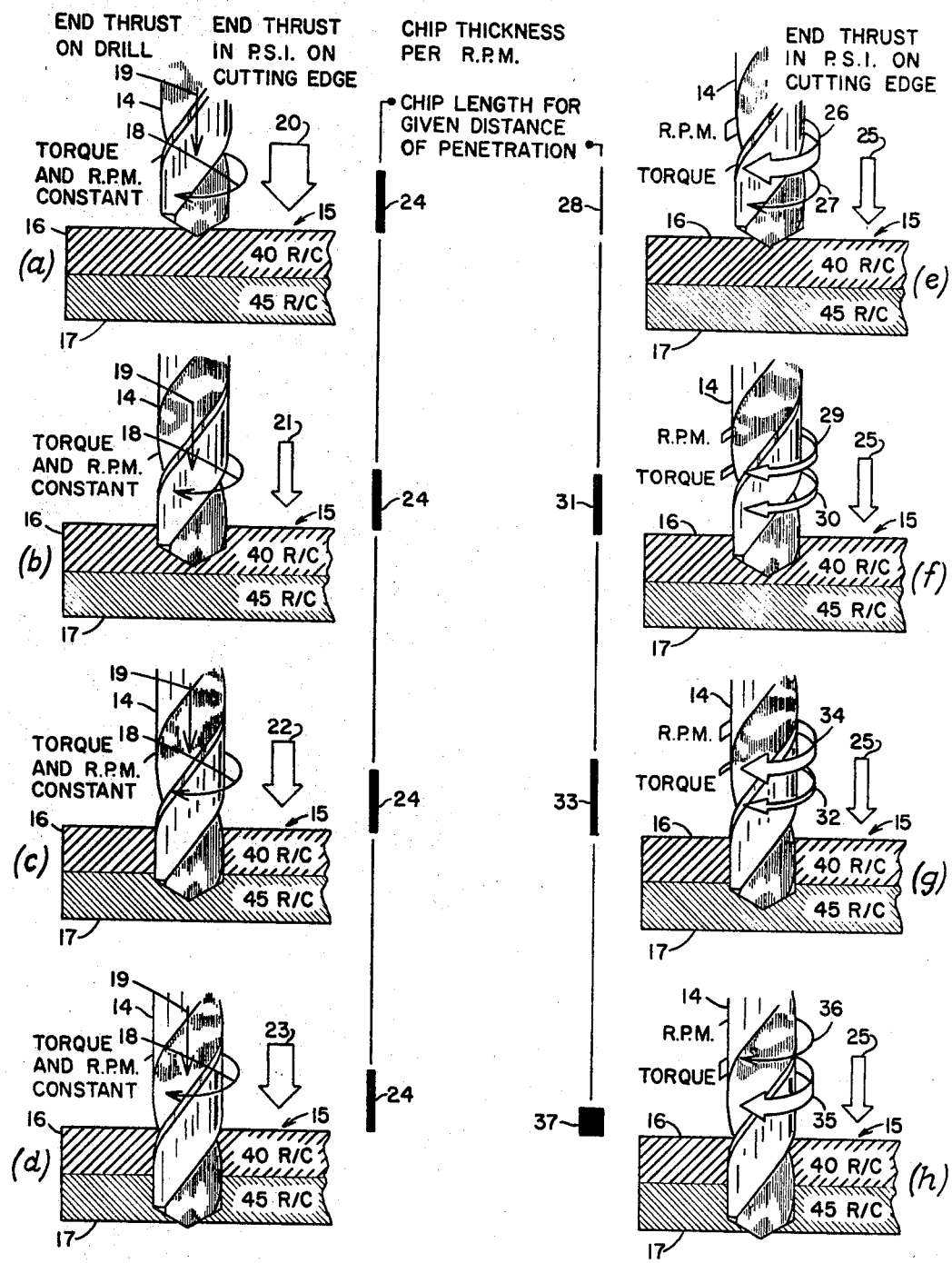
FIG. 2 is a diagrammatic view which graphically illustrates the differences in the cutting action obtained from a torque controlled drill as compared to the cutting action of a conventionally driven drill.

With particular reference now to FIG. 2, the chart disclosed therein compares a mechanical feed drilling operation, FIG. 2 (*a–d*), with a torque controlled operation, FIG. 2 (*e–h*). Equal conditions such as drill sharpness, rigidity, etc., for both operations are assumed, and it is further assumed that in both operations the drill presses employed are set for equal performance in terms of time to penetrate, drill type, and style, etc. In each case, a drill 14 is engaged with a composite work piece 15 having an upper layer 16 (40 R/c) and a relatively harder lower layer 17 (45 R/c).

*Mechanical feed*

Referring now to FIG. 2(*a–d*) which progressively shows the penetration of drill 14 into and through the composite layers 16 and 17 in a mechanical feed drilling operation, it will be seen that torque and speed (r.p.m.) are constant, as depicted by the uniformly weighted arrows 18. Likewise, the end thrust on the drill is also constant, as depicted by the uniformly weighted arrows 19.

As the drill contacts the work, the end thrust in p.s.i. on the cutting edge immediately reaches a very high value, as depicted by the arrow 20, FIG. 2(*a*). The cutting edge end thrust depicted by arrow 21, FIG. 2(*b*), decreases, however, as the drill buries into the work and more cutting edge area is exposed to the work. R.p.m., torque, and drill end thrust remain constant. Assuming no drill dulling, cutting edge end thrust holds steady until harder or softer material conditions are encountered or until approach to break through occurs. Thus, as the harder layer 17 is engaged by the drill, the cutting edge end thrust increases, as depicted by arrow 22, FIG. 2(c), and further increases on break through, as depicted by arrow 23, FIG. 2(d). During the entire penetration, the chip thickness and length for a given distance remains constant, as depicted by the uniformly weighted lines 24.

*Torque control*

Referring now to FIG. 2(e–h) wherein the drill 14 is depicted as penetrating into and through the composite material 15 under torque control of the drill, it will be seen that the cutting edge end thrust remains constant, as depicted by the uniformly weighted arrows 25.

The free running speed of the torque controlled drill press is greater than that of the mechanical feed press. Thus, as the drill engages the work, the speed, depicted by the reltaively wide arrow 26, FIG. 2(e), is greater than in the case of the mechanical feed, FIG. 2(a). Very little torque is needed for the small amount of the cutting edge exposed and the light chip produced, these being indicated respectively by the relatively light weighted torque arrow 27 and thin, long chip line 28, FIG. 2(e).

As the drill buries into the work, however, the torque need increases, as depicted by the somewhat widened torque arrow 29, FIG. 2(f), and the r.p.m. decreases, as indicated by the relatively lightly weighted arrow 30. Under these speed-torque conditions, a heavier chip is produced, as indicated by the broadened and shorter chip line 31, FIG. 2(f).

It may be observed comparatively that the operating conditions of the mechanical feed and torque controlled drilling operations, as depicted in FIGS. 2(b) and 2(f), are substantially identical, and the two drilling systems would perform substantially equally from this point on unless softer or harder material is encountered or until break through occurs.

Thus, when drill 14 encounters the harder material of layer 17, as shown in FIG. 2(g), the torque again decreases, as depicted by the lightly weighted arrow 32, and a lighter, longer chip is produced, as indicated at 33. As the torque decreases, the r.p.m. increases, as depicted by the widened speed arrow 34, FIG. 2(g). On break through, the torque greatly increases and the speed substantially decreases, as respectively depicted by the wide torque arrow 35 and thin speed arrow 36. A heavy short chip is produced, as depicted by the short, wide chip line 37.

In summary, it may be stated that the mechanical feed system is characterized by constant drill end thrust, speed, torque, and chip produced, with cutting edge end thrust being the inevitable variable. In the torque controlled system, on the other hand, speed, torque, and chip produced are dependent variables, with the cutting edge end thrust being constant.

As aforestated, a high rake angle is desired for cutting to reduce heat and generally to provide for improved machining performance in a torque controlled metal removal system. In order to compare the relative performances of conventional and torque controlled milling machines, however, cutters, maintained as matched sets, were used alternately between conventional and torque controlled machines after each resharpening, and the same part, a fitting, two legs, material A–286, forged, was straddle milled (approximately 1.8 cubic inches of material removed) on each machine with results as follows:

Conventional mill _____ 6 to 8 parts/shift.
                                     3 to 4 parts/set of cutters.
Torque controlled mill _____ 22 parts/shift.
                                     22 parts/set of cutters.
Cost of cut, each leg:
    Convention _____ $7.62.
    Torque controlled _____ $1.97.

Conventional machines, although incapable of matching the performance of the torque controlled machine, may be operated to give optimum performance by setting feed and speed values in accordance with information established on a torque controlled machine. A T section, for example, was first straddle milled from René 41, hardened and aged RC 35, on a 3 to 3½ horsepower torque controlled machine to gain speed and feed information and then, using this information, the same operation was attempted on a conventional 25 horsepower mill having a minimum speed of 16 r.p.m. and minimum feed of .3750 inch per minute.

A cut .9 inch deep by .75 inch wide produced by the torque controlled machine required a speed varying from 13 to 17 r.p.m. and a feed ranging from .25 inch to .3125 inch per minute. An identical set of matched cutters (6 inch diameter HSS) was used on the conventional mill, but the cutter broke when the depth of cut reached .4 inch. At a reduced depth of cut of .3 inch, a successful pass of the cutters was possible, but cutter life was limited to a single pass. In terms of cuts and cutters required to make this part, the torque controlled and conventional mills compare as follows:

|  | Number of cuts | | Number of sets of cutters |
|---|---|---|---|
|  | Rough | Finish |  |
| Torque controlled | 1 | 1 | 1 |
| Conventional | 3 | 1 | 4 |

From the foregoing, it should now be fully apparent that the application of torque control to machining operations affords improved quality and substantial cost saving in productivity and tool life, particularly as applied to the machining of exotic metals. It will be understood, however, that the efficiency of the torque control system is predicated on the ability of the tool drive motor to sense the reactions between the tool and the work and the ability and sensitivity of the feedback system in response to such reactions to direct and make appropriate changes in the operating conditions, such as may be required for optimum machining. The efficiency of a torque controlled mill, for example, depends on the sensitivity of the spindle and feed motors and of the feedback system including such driving connections employed as between the feed motors and machine slides. To improve feedback sensitivity, for example, table drag and gear and clutch masses should be reduced to a minimum in the feed driving system.

Figure 4:
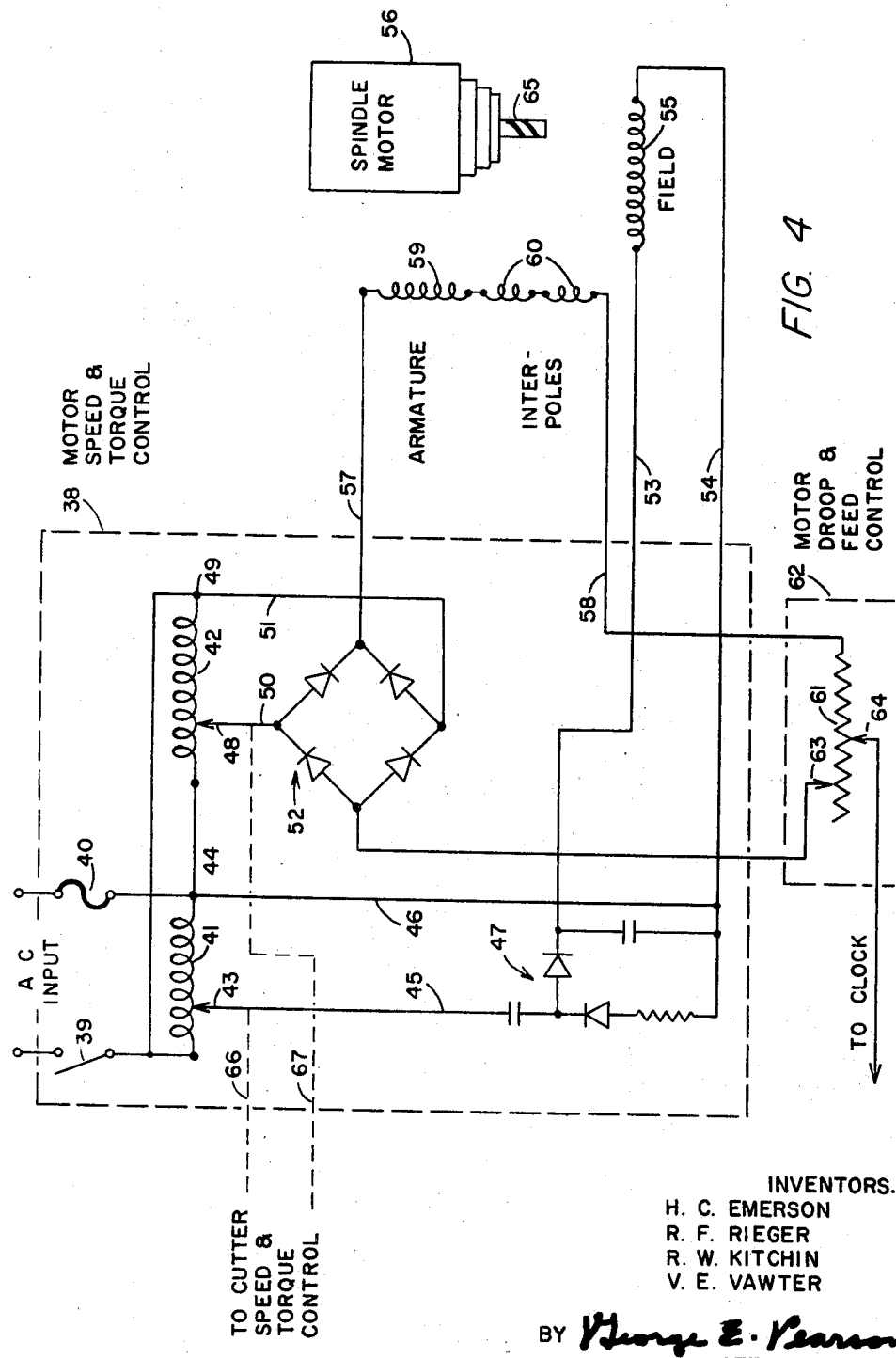
FIG. 4 is a circuit diagram of the spindle motor control units or blocks of FIG. 3.

A torque control unit suitable for the purpose is disclosed in FIG. 4 wherein it may be seen that the motor speed and torque control unit 38 is operable from an AC source which feeds through input switch 39 and fuse 40 to a pair of variacs 41 and 42 connected in parallel across the input line. The voltage appearing between wiper 43 and terminal 44 of variac 41 is applied by way of lines 45 and 46 to a half wave voltage doubler generally designated 47 which is of conventional design. The voltage appearing between wiper 48 and terminal 49 of variac 42 is applied by way of lines 50 and 51 to a full wave rectifier generally designated 52.

The DC output of half wave doubler 47 appearing across output lines 53 and 54 is applied to the field winding 55 of a spindle motor 56. The DC output appearing across output lines 57 and 58 of full wave rectifier 52 is applied to the armature winding 59 in series with the interpole windings 60 of motor 56. Line 58 of this DC output line has inserted therein an adjustable resistor 61 which functions as a motor droop and feed control generally designated 62. Resistor 61 receives the armature current and provides means for adjusting the same in accordance with the setting of its wiper 63. As will presently more fully appear, the speed-torque droop characteristics of motor 56 depend to a large extent on the adjustment of wiper 63 and, hence, the speed of motor 56 becomes automatically adjustable as a function of armature current or spindle motor torque.

Resistor 61 has a second wiper 64 to provide a voltage which is proportional to the armature current, and hence, to the torque of the spindle motor 56. As will subsequently more fully appear the voltage on wiper 64 is used to control the rate of feed of the slides of a milling machine of which motor 56 forms a part. To this end, motor 56 has a milling cutter 65 attached to the shaft thereof, although it is to be understood that this motor and its associated controls 38 and 62, may be used to advantage, for example, in torque controlled drilling, sawing, or other metal removal operations.

Mechanical connections 66, 67 to variac wipers 43 and 48 provide means for adjusting motor 56 to initial speed and torque settings (full load torque) in accordance with a particular material to be machined, as will subsequently be more fully described.

Figure 5:
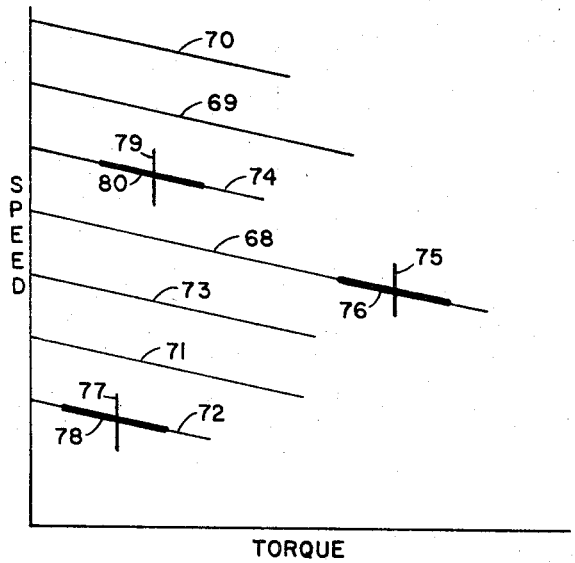
FIG. 5 is a graph illustrating the speed-torque characteristics of the spindle motor of FIG. 4.

Motor 56 generally has the winding arrangement of a separately excited shunt-type motor and is therefore inherently self-regulating as regards speed, having a speed-torque droop characteristic as depicted by the line 68 in FIG. 5. As is well known, the speed of such a motor may be approximately doubled by weakening the field current, as by adjustment of variac 41, where the machine operates normally with a nearly saturated magnetic circuit. With further weakening of the field, however, the field intensity at the pole tips becomes so weakened by armature reaction, especially under loud conditions, that commutation is seriously impaired. To avoid sparking and extend the speed range through field adjustment to a ratio of maximum to minimum speed the order of 5 to 1, interpoles and windings 60 are used in a well known manner to thus render motor 56 in the nature of a cumulative compound wound motor.

The effect of resistor 61 in series in the armature circuit of motor 56 is to give the same pronounced droop characteristics, as may be desired. In other words, the slope of line 68, FIG. 5, may be increased or decreased as wiper 63 is adjusted to increase or decrease the effective resistance in the armature circuit, the downward slope of the characteristic being determined by the combined resistance of the armature and interpole windings 59 and 60 and resistor 61.

In accordance with the expression for the speed of a DC motor $$S = \frac{E - Ia(Ra + Ri + R_{61})}{K_1 \theta}$$

where:

S = speed, R.P.M.
$\theta$ = field flux, lines per square inch
E = supply voltage, volts DC
Ia = armature current, amps DC
Ra = armature resistance, ohms
Ri = interpole resistance, ohms
$R_{61}$ = adjustable resistor 61, ohms
$K_1$ = motor constant the speed is increased as the flux $\theta$ is decreased upon reducing the AC voltage at wiper 43 of variac 41. The torque, however, is decreased in accordance with the expression $$T = K_2 \theta Ia$$

since the torque T is directly proportional to the flux, $K_2$ being a second motor constant. Thus, different settings of variac 41 produce different droop characteristic curves such as 69 and 71, FIG. 5, wherein the maximum torque is less than that obtainable when the motor is operated according to curve 68.

Both speed and torque are proportional to armature current as may be seen from the above expressions. Accordingly, a decrease in the voltage at wiper 48 of variac 42 will produce droop characteristic curves such as depicted at 71 and 72 in FIG. 5.

Adjustment of both variacs, such that the one alone would tend to produce curve 69 and the other alone curve 71, would tend to produce a resultant curve such as 73. Similarly, simultaneous adjustments tending separately to produce curves 70 and 72, would tend to produce a resultant curve such as 74. Thus, a family of curves, such as 68 to 74, is provided by adjustment of the variacs, one or the other, or both, with the result that the motor may be set, for example, to operate with a normal operating torque such as depicted by the line 75 to machine aluminum, the torque and speed in this case varying as required within the region of curve 68 depicted by the heavy line 76. In another example, the motor may be set to operate relative to a normal operating torque 77 in the region 78 of curve 72 when an exotic metal such as René 41 is to be machined. Still another material may require the low normal torque 79 and higher speed afforded by region 80 of curve 74.

It will thus be apparent that through adjustment of variacs 41 and 42 by manipulation of their respective mechanical connections 66 and 67, motor 56 may be set to operate in accordance with predetermined conditions and in relation to predetermined work materials, as by programming for such adjustments in a numerical control system.

Figure 3:
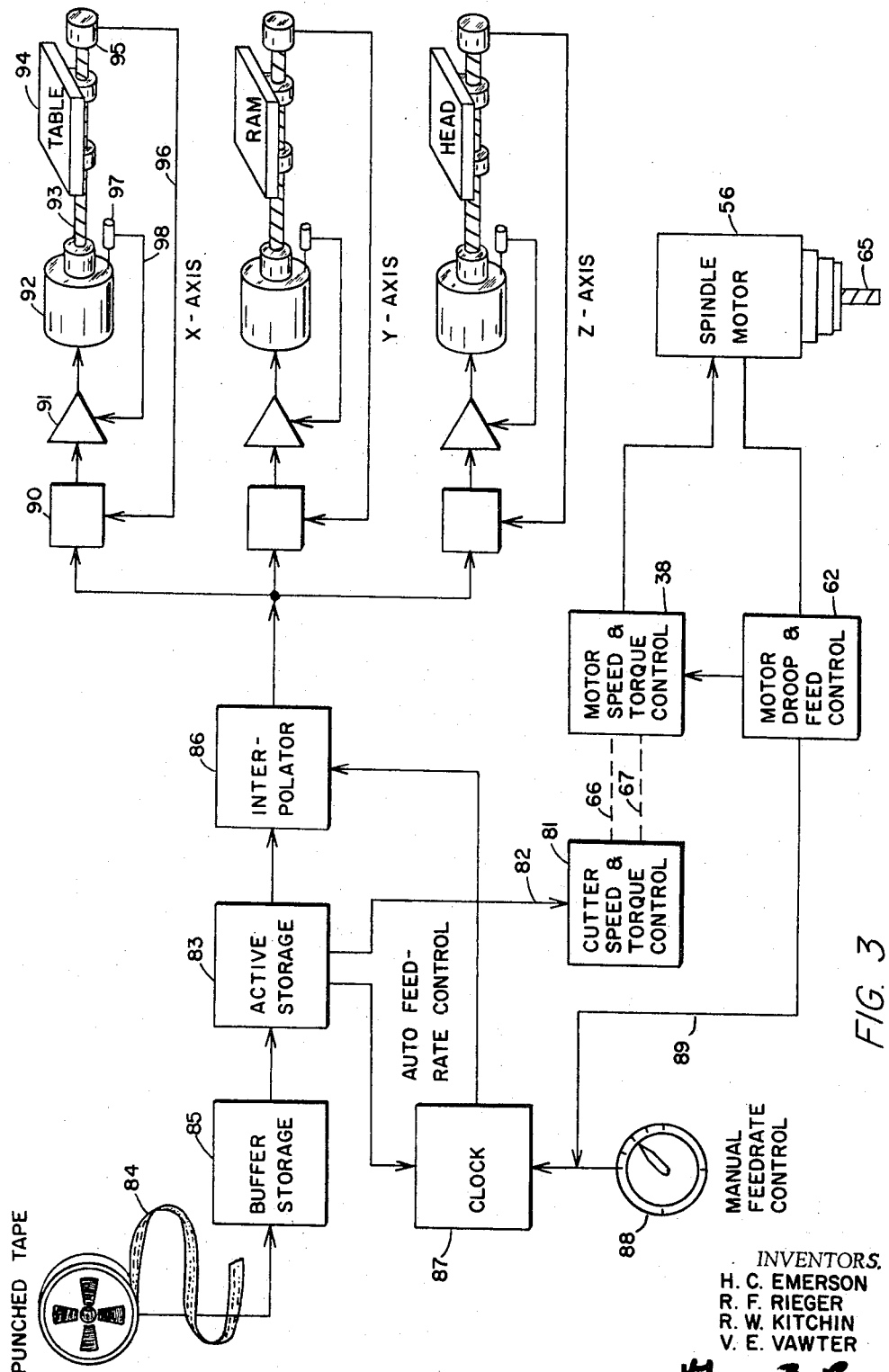
FIG. 3 is a diagrammatic view in block diagram form of the complete electrical circuit arrangement for the combined numerical and torque controlled 3–D milling machine system of the present invention.

A numerical control system suitable for the purpose is disclosed in FIG. 3 and comprises as component parts thereof, motor 56 and its speed and torque control 38 and droop and feed control 62. In this system, the positions of variac wipers 43 and 48, acting through their mechanical connections, 66 and 67 may be set in accordance with the settings given to the cutter speed and torque control 81 which, for this purpose, may comprise stepper switches (not shown) mechanically connected respectively to the wipers. Control 81 may further comprise suitable pulse and servo amplifiers for the stepper switches, and the like circuitry, usually associated therewith, to step the same in accordance with pulses received via line 82 from the active storage unit 83 of the numerical control system. The disclosed numerical control system is one in which the programmed information is stored on input media in the form of a punched tape 84. In this arrangement, a taper reader (not shown), which may be of a mechanical or photoelectric type, depending on the reading speed required, is employed to transfer the tape data to a buffer storage 85. The buffer storage permits the tape reader to operate concurrently with the machining operations, thus providing a time sharing arrangement as between the tape reading and machine motions. The stored data is transferred to the active storage 83, which permits uninterrupted machine operation, and from thence, to the interpolator 86 which receives position data, to the clock 87 which receives feed rate data in the form of a feed rate number, and via line 82 to supply the aforementioned cutter speed and torque pulses to control 81.

Clock 87 is of a beat frequency oscillator type whose frequency is divided down in accordance with feed rate numbers received from active storage 83, thereby to provide a clock frequency output which is supplied to the interpolator 86 and determines the rate of interpolation, or feed rate of the machine slides. The manual feed rate control 88, in accordance with the manual adjustment thereof, supplies a variable voltage to clock 87 to vary the frequency of its variable oscillator. This variable frequency is mixed with that of a fixed frequency oscillator in the clock to provide its adjusted frequency output. The programmed feed rates may thus be adjusted by the operator at any time, above or below the programmed value, to override the same as may be required, for example, to fit the material or cutter condition.

In a similar manner, the variable DC voltage appearing on wiper 64 of motor droop and feed control 62 is applied via line 89 to the manual override input to clock 87 and, in order to provide a fully variable frequency output therefrom, this voltage input is arranged to cover the full range to override the feed rate to zero. Since, as aforenoted, the output of the clock determines the feed rate of the machine slides, an increase in voltage applied via line 89 from feed control 62 will effectively slow the machine down as the torque requirements to cutter 65 increase.

Interpolator 86, which in addition to the position data received from active storage 83, also receives feed rate data from clock 87, translates this data into velocity and position directions for each of the X, Y, and Z axes of the machine. For each .0001 inch of motion programmed, for example, one pulse is generated, and the pulse rate determines the feed rate of the slides.

The servo systems for the three axes are identical and it therefore suffices herein merely to describe that of the X axis which provides for the table movement, each servo system comprising a mixer 90, an error signal amplifier 91, a drive motor 92 for the screw which, in turn, drives the slide 94 a position feedback transducer 95 and feedback line 96 therefrom, and velocity feedback tachometer and feedback line 98 therefrom.

Each pulse generated by interpolator 86 induces phase shift in a reference waveform or signal for each axis. These command signals for each of the three axes are generated simultaneously to thereby provide for coordinated motion of the machine slides. It will be understood that the work is carried by the ram slide which moves transversely of the table slide, thus providing for movement of the work along the X and Y axes in the X-Y plane. The head slide moves perpendicularly with respect to the X-Y plane along the Z axis and carries the spindle motor 56 to thus provide for movement of the cutter parallel to its axis.

The mixer 90 of each servo system receives it command signal from the interpolator 86, as aforementioned, and compares the same with the feedback original received via feedback line 96 from transducer 95, the transducer, by way of example, being in the form of a resolver coupled to the screw 93. This resolver determines the actual position of the machine. The mixer detects the difference between the command and feedback signals to provide an error signal for driving motor 92 to thus make correction for the difference in the commanded and actual positions of the slide. Tachometer 97 is coupled to the drive motor 92, and a feedback signal therefrom is supplied via feedback line 98 to error amplifier 91 to make correction for any difference in the commanded and actual feed rates of the slide. Elements 90 to 96 comprise the position servo loop which is closed. A second closed loop is the velocity servo loop and this consists of elements 91, 92, 97 and 98. Element 97 in this case is a D.C. tachometer. The velocity loop does not determine position, it only affects the gain of the system and is primarily used to allow higher gain in the amplifiers without erratic motion.

From the foregoing, the operation of the combined numerical and torque control systems of FIG. 3 should now be apparent. By way of summary, however, it may be stated that the position movements of the table, ram, and head slides of the machine are directed by the programmed information of the numerical control portion of the system in the usual manner, and the rate of these movements may likewise be program-controlled as long as the operating conditions remain constant. In addition, the initial operating conditions, or parameters, i.e., the proper speed and torque settings of the spindle motor for a given work material may also be programmed, as by effecting initial settings of variacs 41 and 42.

Variations in the loading of the work on the cutter are fortuitous, however, and cannot be predicted and programmed. Accordingly, it is necessary to provide for an automatic override of the feed rate control of the slide movements afforded by the numerical control system when such fortuitous loading variations occur, and to provide, moreover, for an appropriate change in the speed of the spindle motor according to the torque changes resulting from the sensed reactions between the cutter and the work, all to the end that the cutting edge end thrust may be held constant and the cutter speed and torque held within limits compatible with the yield of the material to the cutting tool. Alternatively, the feed rates of the slides need not be programmed at all, since the rate determination, as in the case of 100% override, may be caused to vary solely as a function of spindle torque.

The inherent speed-torque droop characteristics of a compound wound DC motor, namely spindle motor 56, are utilized to make the spindle speed sensitive to the loading of the work on the tool, i.e., to the spindle torque. As otherwise expressed, the parameters of the spindle motor are made such as to cause the motor speed to vary as a function of the motor torque.

Adjustable resistance, namely resistor 61 and its wiper 63, is inserted into the armature circuit to further enhance the sensitivity of the motor speed to variations in the spindle motor torque and also to provide, as at resistor wiper 64, a voltage which varies as a function of the armature current or motor torque, this being the variable DC voltage used to adjust the clock output frequency to thus render the feed rate of the machine variable as a function of the spindle torque.

The field and armature windings are separately excited from a common AC source, and each excitation is separately adjustable to thus provide a family of speed-torque droop characteristic curves whereby the operating parameters of the motor may be set initially in accordance with the yield characteristics of the material to be machined. Thus, for example, the speed-torque operating characteristics of the cutter motor may be set to provide low energy output as where low speed and low torque are required for optimum machining of a particular material such as the exotic metals.

It should now be apparent that new and improved methods and means of metal removal have been provided which are well adapted to fulfill the aforestated objects of the invention. It will be understood moreover, that this invention may be embodied in other forms or carried out in other ways without departing from the spirit or essential characteristics thereof. The present embodiments of the invention are therefore to be considered in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. In an energy-torque controlled machining system, the combination of a cutting tool, a drive motor for said tool having a family of speed-torque droop characteristic curves, means for adjusting the operating parameters of said motor to provide speed and torque requirements in relation to said curves and compatible with the material yield characteristics of a workpiece to be machined and thereby further to render the energy supplied by the machine system compatible with the energy required for said machining of the workpiece, and means for adjusting the slope of said droop characteristic curves thereby to render the speed sensitivity of the motor to variations in the motor torque compatible with the full range of changes in the loading of the workpiece on the cutting tool.

2. An energy-torque controlled system as in claim 1, said motor being a compound wound DC motor, said parameter adjusting means comprising adjustable sources for separately exciting the field and armature windings of said DC motor, and said slope adjusting means comprising a variable resistance disposed in series with said armature winding.

3. An energy-torque controlled system as in claim 2, said adjustable sources comprising a pair of variacs operable in parallel from an AC line, a half wave doubler operable from one of said variacs and having its output connected across the field winding of said DC motor.

4. In a combined numerical and torque controlled system of the character disclosed, the combination of a machine having a tool drive motor and correlated workpiece and tool movements, numerical control means including input media having programmed data for initially setting the operating speed and torque of said tool drive motor to values compatible with the material yield characteristics of the workpiece to be machined and having position and velocity data for directing said machine movements by numerical control to positions and at feed rates according to said position and velocity data, said numerical control means comprising voltage responsive means for overriding said numerically controlled feed rate of said machine movements, and means responsive to variations in the loading of the workpiece on the tool for varying the speed of said tool drive motor and for generating and applying a variable voltage to said feedrate override means.

5. A combined numerical and torque controlled system as in claim 4, and wherein said tool motor is settable selectively in accordance with a family of speed-torque droop characteristic curves provided thereby and said variable override voltage is provided as a function of the motor torque.

6. A combined numerical and torque controlled system as in claim 5, and wherein said tool motor is a cumulative compound wound DC motor having a variable resistance in its armature circuit to adjust the downward slope of said droop characteristic curves and to provide said override voltage as a function of the armature current.

7. A combined numerical and torque controlled system as in claim 6, and wherein said tool motor has separate adjustable excitation sources for respectively energizing its field and armature windings from an AC source.

8. In a metal working machine for moving a cutting tool through a workpiece, the combination of: a spindle including means for carrying a cutting tool therein; first drive means for advancing said spindle; second drive means for rotating said spindle; means for sensing the torque of said spindle; means for sensing the advance feed thrust of said spindle; means for sensing the rotational velocity of said spindle; means for sensing the advance feed velocity of said spindle; first control means having the outputs of said feed thrust and feed velocity sensing means as inputs and providing an output to said first drive means for varying the output thereof to maintain the feed thrust substantially equal to a predetermined value; and second control means having the outputs of said torque and rotational velocity sensing means as inputs and providing an output to said second drive means for varying the output thereof to maintain the spindle torque substantially equal to a predetermined proportion of the feed thrust.

9. In a metal working machine for moving a cutting tool through a workpiece, the combination of: a spindle including means for carrying a cutting tool therein; first drive means for advancing said spindle; second drive means for rotating said spindle; means for sensing the torque of said spindle; means for sensing the advance feed thrust of said spindle; first control means having the output of said feed thrust sensing means as an input and providing an output to said first drive means for varying the output thereof to maintain the feed thrust substantially equal to a predetermined value; and second control means having the output of said torque sensing means as an input and providing an output to said second drive means for varying the output thereof to maintain the spindle torque substantially equal to a predetermined proportion of the feed thrust.

10. In a metal working machine for moving a cutting tool through a workpiece, the combination of: a spindle including means for carrying a cutting tool therein; first drive means for advancing said spindle; second drive means for rotating said spindle; means for sensing the torque of said spindle; means for sensing the advance feed thrust of said spindle; first control means having the output of said feed thrust sensing means as an input and providing an output to said first drive means for varying the output thereof to maintain the feed thrust substantially equal to a predetermined value; and second control means having the output of said torque sensing means as an input and providing on output to said second drive means for varying the output thereof to maintain the spindle torque substantially equal to a command value.

11. In a metal working machine for moving a cutting tool through a workpiece, the combination of: a spindle including means for carrying a cutting tool therein; first drive means for advancing said spindle; second drive means for rotating said spindle; means for sensing the torque of said spindle; means for sensing the advance feed thrust of said spindle; first control means having the output of said feed thrust sensing means as an input and providing an output to said first drive means for varying the output thereof to maintain the feed thrust substantially equal to a predetermined thrust value; second control means having the output of said torque sensing means as an input and providing an output to said second drive means for varying the output thereof to maintain the spindle torque substantially equal to a predetermined proportion of the feed thrust; and means for manually setting said thrust value and said torque-to-thrust proportion.

12. A method of machining material with a curvilinear tool including the steps of: rotating the tool; advancing the tool through the material; maintaining the thrust of the tool advance drive substantially equal to a predetermined value; and maintaining the torque of the tool rotation drive substantially equal to a predetermined ratio with the thrust.

13. A method of machining material with a curvilinear tool including the steps of: rotating the tool; advancing the tool through the material during an operation cycle including entry, incut and exit stages; maintaining the thrust of the tool advance drive substantially equal to a predetermined value; maintaining the torque of the tool rotation drive substantially equal to a predetermined ratio with the thrust; and varying the predetermined thrust value and the predetermined ratio as functions of the stage of the operation cycle.

14. A method of machining material with a curvilinear tool including the steps of: rotating the tool; advancing the tool through the material; maintaining the thrust of the tool advance drive substantially equal to a predetermined value; maintaining the torque of the tool rotation drive substantially equal to a predetermined ratio with the thrust; when the tool rotation velocity tends to exceed a predetermined maximum, reducing the torque requirement and the thrust requirement; and when the tool advance velocity tends to exceed a predetermined maximum, reducing the thrust requirement.

15. A method of machining material with a curvilinear tool including the steps of: rotating the tool; advancing the tool through the material; and controlling the tool advance drive and the tool rotation drive by varying the power supplied to the tool rotation drive and to the tool advance drive to maintain the thrust of the tool advance drive and the torque of the tool rotation drive substantially equal to predetermined values and thereby maintain the force at the tool cutting edge substantially constant per unit edge area in contact with the material.

References Cited

UNITED STATES PATENTS

| | | | |
|---|---|---|---|
| 1,989,187 | 1/1935 | Fitz-Gerald | 318—39 X |
| 2,278,212 | 3/1942 | Mayer | 318—39 X |
| 2,336,434 | 12/1943 | Wurzbach | 319—39 X |
| 2,411,162 | 11/1946 | King | 318—39 |
| 2,491,983 | 12/1949 | King et al. | 318—39 |
| 2,546,692 | 3/1951 | Greene et al. | 318—39 |
| 2,600,988 | 6/1952 | Green et al. | 318—12 |
| 2,649,646 | 8/1953 | Remmen | 318—39 X |
| 3,079,522 | 2/1963 | McGarrell | 318—162 |
| 2,809,333 | 10/1957 | Wagner | 318—39 |
| 3,090,266 | 5/1963 | Wagner | 318—39 X |
| 3,190,139 | 6/1965 | Swanson et al. | 318—39 X |
| 3,224,338 | 12/1965 | Reynolds | 318—39 X |

FOREIGN PATENTS 829,824  3/1960  Great Britain.

OTHER REFERENCES

"Electronics and Nucleonics Dictionary" (Coke and Warkeus) published by McGraw-Hill 1960, p. 526.

"The International Dictionary of Physics and Electronics" (Von Nostrand) published by D. Von Nostrand Company, Inc. 1959, p. 970.

GERALD A. DOST, *Primary Examiner.*

U.S. Cl. X.R.

318—162; 90—13.5